United States Patent Office 3,639,337
Patented Feb. 1, 1972

3,639,337
COPOLYMERS OF POLY(2,6-DIPHENYL-
1,4-PHENYLENE OXIDE)
Johann F. Klebe, Schenectady, N.Y., assignor to
General Electric Company
No Drawing. Filed Nov. 30, 1970, Ser. No. 93,811
Int. Cl. C08g 23/20
U.S. Cl. 260—47 ET               10 Claims

ABSTRACT OF THE DISCLOSURE

Poly(2,6-diphenyl-1,4-phenylene oxide) is converted to a copolymer by metalating the meta position of some of the phenylene rings which, through a series of reactions, leads to introduction of a quinoid substituent in the meta position or to ring closure with conversion of the phenylene unit to a fluorene or fluorenone unit. Because of the completely aromatic nature of the copolymer it is very oxidation resistant. The introduction of these new repeating units along the chain of the initial polymer introduces an irregularity so that the polycrystalline nature of the initial polymer is destroyed resulting in a copolymer which is readily moldable without necessity for rapid cooling to prevent embrittlement.

---

This invention relates to copolymers of poly(2,6-diphenyl-1,4-phenylene oxide) and to a process of making the same. More specifically, this invention relates to copolymers of poly(2,6-diphenyl-1,4-phenylene oxide) wherein the repeating units are 2,6-diphenyl-1,4-phenylene oxide units and aryl substituted 1,4-fluoroenylene oxide units and/or 2,6-diphenyl-1,4-phenylene oxide units substituted in the 3-position with a substituent having a quinoid structure as more particularly defined later.

The repeating units of the copolymer have the formulae:

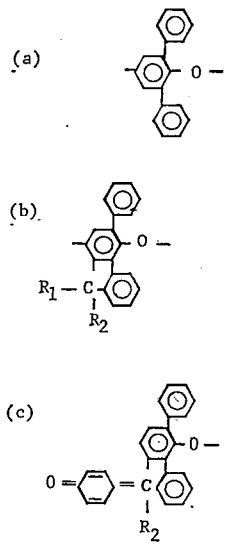

where, independently $R_1$ is phenyl, p-$C_{1-8}$-alkylphenyl or p-$C_{1-8}$-alkoxyphenyl, $R_2$ is the same as $R_1$ and in addition, hydrogen or, together $R_1$ and $R_2$ are oxygen. It is obvious that when $R_1$ and $R_2$ together represent oxygen that Formula b becomes:

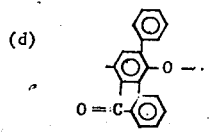

Typical examples of the $C_{1-8}$-alkyl groups that can be present on the phenyl nucleus are: methyl, ethyl, propyl, isopropyl, the various butyl isomers, i.e., n-butyl, isobutyl, sec-butyl, tert-butyl, etc., the various amyl isomers, the various hexyl isomers, including cyclohexyl, the various heptyl isomers, the various octyl isomers, etc. Examples of the various alkoxy groups that can be present on the phenyl nucleus are the same as the above $C_{1-8}$-alkyl groups but which are joined to the phenyl nucleus through oxygen, i.e., methoxy, ethoxy, butoxy, octoxy, etc.

Polyphenylene oxides, as a general class, are an extremely interesting group of new polymers. These polymers and processes of producing them are disclosed and claimed by Hay in his U.S. Pats. 3,306,874; 3,306,875 and 3,432,466. Of these polymers, poly(2,6-diphenyl-1,4-phenylene oxide) has proven to be a very interesting polymer. It is a thermoplastic polymer with a very high softening point and excellent thermal stability. However, it has one characteristic that makes it extremely difficult to mold into many desired objects. Although the polymer can be made as an amorphous material, when heated above its softening or melting point ($T_m$) of about 480° C., it readily crystallizes on cooling with the crystalites being unoriented. It will also crystallize when heated to a temperature of 260° C. up to $T_m$. This is undesirable in molded objects, since the molded object in the unoriented crystalline state tends to be brittle. Since it is necessary to heat the polymer above its glass-transition temperature ($T_g$) to mold or shape it, it is necessary to mold this material in the narrow temperature range between $T_g$ and about 260° C. to avoid crystallization.

Crystallinity or rather the abiilty to crystallize is highly desirable in polymers used in making films and fibers, in which the crystallites are oriented by "cold drawing," i.e., stretching at a temperature below $T_m$ and generally in the range between $T_g$ and $T_m$ after the polymer is in the crystalline state. The tendency of poly(2,6-diphenyl-1,4-phenylene oxide) to crystallize is so great that solutions of the amorphous polymer in certain solvents, for example, on standing, gradually precipitate the polymer in the crystalline form. The crystalline form is insoluble in almost all of the solvents in which the amorphous form of the polymer is soluble. It is believed that the tendency of this polymer to crystallize so readily is due to the fact that both substituents are the same and both are large, bulky groups.

It would be highly desirable to be able to make a polymer having the high softening point and high oxidation resistance of the poly(2,6-diphenyl-1,4-phenylene oxide) but without the tendency to crystallize. One means of providing such a polymer is disclosed and claimed by Hay in his U.S. patent, 3,432,466, wherein polymers are made from 2,6ldiarylphenols where the two aryl substituents are different. Such phenols are less readily available than 2,6-diphenylphenol and their synthesis is more complicated. It would be highly desirable to be able to obtain the same results with a polymer requiring only 2,6-diphenylphenol.

Hay in his U.S. patent, 3,402,144 discloses that the general class of poly(phenylene oxides) can be readily metalated with an alkali metal to produce a polymer which is extremely reactive with a wide variety of agents to produce modified poly(phenylene oxides). When the metalation is carried out on a polymer of a 2,6-diarylphenol, metalation only occurs in the unsubstituted positions of the phenylene unit of the polymer, i.e., in the two meta or 3 and 5 positions. Treatment of the metalated polymer with reactive compounds introduces substituents in these positions.

I have now discovered that the products obtained by reacting carbon dioxide, an aryl aldehyde or a diaryl ketone with the metalated polymer of 2,6-diphenylphenol can be reacted further to produce a polymer still retaining the high temperature characteristics of the poly(2,6-diphenyl-1,4-phenylene oxide) but now having the added property of being able to be molded with no danger that the product will crystallize either on cooling or during later use.

Since the degree of metalation is easily controlled, the amount by which the polymer is modified by reaction is likewise easily controlled to give the desired degree of modification of the properties from the initial polymer. For example, if only 1–2% of the units have been so modified, there will be a noticeable loss of crystallinity of the polymer and when 10–15% of the units have been so modified, there will be a very decided decrease in crystallinity. In the range of 20–40%, molding is readily accomplished with no evidence of crystallinity. Because of the conjugated double bonds in the quinoid structure shown in Formula $c$, such units produce coloration of the polymer enabling the permanent color to be built into the polymer molecule.

The making of the poly(2,6-diphenyl-1,4-phenylene oxide) and its metalation form no part of this invention. The polymer is preferably prepared and metalated as disclosed by and claimed by Hay in his U.S. Pats. 3,402,144 and 3,431,466, which are hereby incorporated by reference as to these procedures. The reaction of the metalated polymer to form the intermediates, proceeds readily at room temperature and its completion is readily followed since the metalated polymer is highly colored and the reaction with carbon dioxide, the aldehydes or ketones causes the color to be discharged when complete since the reaction products are not colored.

The initial reaction of these reagents with the metalated polymer introduces the substituents shown in Table I into the meta or 3-position.

TABLE I

| Reagent | Substituent |
| --- | --- |
| $CO_2$ | —COOH |
| $R_1$—CHO | —CHOH<br>\|<br>$R_1$ |
| $R_1$—C—$R_1$<br>\|\|<br>O | $R_1$—C—OH<br>\|<br>$R_1$ |

It is to be recognized that both of the $R_1$ substituents in the ketone do not need to be identical, i.e., the ketone can be either a symmetrical or an unsymmetrical ketone. It is likewise to be recognized that replacing one $R_1$ with $R_2$ in the formula of the ketone gives a formula which is generic to both the aldehyde and ketone, where $R_1$ and $R_2$ are as defined previously.

Treatment of polymer having secondary or tertiary alcohol substituents as shown in Table I with mineral acids or Friedel-Crafts catalysts results in elimination of water and formation of 1,4-fluorenylene units having the Formula $b$ shown above. When one of the R substituents is alkoxyphenyl a competing reaction occurs, the extent being dependent on the amount of water present in the reaction system. Under anhydrous conditions very little of the competing reaction occurs, but it can be detected because it produces a chromophore substituent in the 3-position rather than ring closure. The product of this competing reaction is predominantly formed in the presence of aqueous acid, by loss of alcohol involving the alkoxy ether and the hydroxyl group on the benzylic carbon. An orange colored quinoid group is thus produced having the structure shown in Formula $c$.

In order to produce units having Formula $d$ the metalated polymer is first reacted with carbon dioxide to introduce a carboxyl group which is thereafter reacted with any halogenating agent known to convert carboxyl groups to acyl halide groups. Conveniently these may be such reagents as thionyl chloride, phosphorus oxychloride, phosphorus pentachloride, etc. Although other halides than the chlorides can be used as is well known in the art, there is no incentive to use them since they are much more expensive and in the succeeding reaction the halogen is converted to a by-product rather than remaining part of the polymer molecule. In the presence of a Friedel-Crafts catalyst, or on heating in the absence of a catalyst, ring closure occurs with formation of hydrogen halide as a by-product by loss of the halogen of the acyl halide and the hydrogen from the ortho-position of the adjacent phenyl group.

The Friedel-Crafts catalysts and the reaction conditions for carrying out cycloalkylation reactions are well known to those skilled in the art. See for example the four-volume set of books edited by George Olah, "Friedel-Crafts and Related Reactions," Interscience Publishers, New York 1963–1965. In my reactions the ring-closing reaction proceeds so readily when the substituent is a tertiary alcohol, i.e., the metalated polymer has been reacted with the diaryl ketone, that only very mild conditions, for example, reaction at room temperature with only a mineral acid, for example, hydrogen chloride is required. When the substituent is a secondary alcohol, i,e., the metalated polymer has been reacted with an aryl aldehyde, hydrogen chloride again can be used but generally heating in a closed reaction vessel to prevent volatilization of the HCl is required to obtain reasonable reaction times. In the case of fluorenone formation from the 3-halocarbonyl-2,6 - diptenyl - 1,4-phenylene units, a convenient Friedel-Crafts catalyst is boron trifluoride which is effective at room temperature. The exact catalyst and reaction conditions used are not critical and can be chosen to suit the convenience of the operator.

In order that those skilled in the art may better understand my invention the following examples are given by way of illustration and not by way of limitation. In all of the examples parts are by weight and temperatures are in degrees centigrade unless otherwise stated. Intrinsic viscosities were measured in chloroform at 25° C. and are given in dl./g.

Example 1

This example shows the actual procedures used for metalating poly(2,6-diphenyl-1,4-phenylene oxide). However, any of the various methods disclosed in the above referenced Hay patent are equally applicable. A solution of 20 g. of poly(2,6-diphenyl-1,4-phenylene oxide)—intrinsic viscosity: 0.78—in 600 ml. of tetrahydrofuran, which had been distilled from calcium hydride, was placed in a 3-necked flask equipped with mechanical stirrer, addition funnel and nitrogen by-pass. The solution was cooled externally with an ice bath and 220 ml. of a solution of n-butyl lithium in hexane (1.5 mmole n-BuLi/ml.) was added dropwise over a period of 2 hours under an atmosphere of dry nitrogen to the stirred polymer solution, causing a deep red color to be developed as metalation proceeded. After completion of the addition, the solution was kept at 2–4° for four hours. Hydrolysis of a sample of this solution with dilute methanolic hydrogen chloride permitted recovery of the polymer which was found to have an intrinsic viscosity of 0.66 showing that no significant degradation was caused by metalation. This polymer solution is designated as metalated polymer A when used in the Examples 2–5.

The polymer solution designated as metalated polymer B in Example 6, was prepared by adding 3 g. of a 40% dispersion of sodium and mineral oil to a solution of 10 g. of the above polymer in 250 ml. of benzene in the same apparatus as described above. While cooling the solution externally with an ice bath, 1.25 g. of n-propyl chloride in approximately 20 ml. of dry benzene was added to the stirred mixture over a period of 30 minutes under an atmosphere of dry nitrogen. The reaction mixture turned purple and gelled shortly before all of the halide was added. A portion of the metalated polymer gel was hydrolyzed with dilute methanolic hydrogen chloride and found to have an intrinsic viscosity of 0.69.

Example 2

A 250 ml. portion of the metalated polymer solution A, in tetrohydrofuran, containing approximately 25 mmoles of repeat units, was poured into excess solid carbon dioxide covered with dry ether in a Dewar flask. The initially purple precipitate turned white on standing for several hours. After filtering off the product, it was dissolved in methanol and precipitated by addition to dilute methanolic hydrogen chloride. After washing and drying, a yield of 6.8 g. of colorless polymer was obtained which was soluble in dimethylformamide and other highly polar solvents but insoluble in benzene and chloroform. The infrared spectrum showed strong carbonyl absorptions at 1700 and 1750 cm.$^{-1}$ and hydroxyl absorption near 3400 cm.$^{-1}$. Elemental analysis: C, 78.9% and H, 4.1%.

A suspension of 500 mg. of the polycarboxylic acid prepared above in 5 g. of anhydrous benzene was stirred at room temperature under dry nitrogen with 500 mg. of bis(trimethylsilyl)acetamide, causing the polymer to go into solution in about an hour. After stirring overnight, the product was recovered by precipitation with hexane. The silylated product was redissolved in benzene, reprecipitated again with hexane and dried at 50°/0.1 mm. for 15 hours. The NMR spectrum of the product showed a single Me$_3$Si signal with the ratio of aromatic to Me$_3$Si protons being 2.1 corresponding to a polymer in which 60% of the original 2,6-diphenyl-1,4-phenylene units were now substituted with a silyl carboxylate group. The IR spectrum now showed sharp carbonyl absorption at 1710 cm.$^{-1}$, and no hydroxyl absorption.

A suspension of 2 g. of the polycarboxylic acid, prepared above, in 20 ml. of thionyl chloride was stirred at room temperature under anhydrous conditions. The polymer swelled initially and went into solution in about 4 hours. The solution was diluted with an equal volume of chloroform and the product precipitated by addition to dry hexane. The white polymer was washed with hexane and dried overnight 25°/0.1 mm. The infrared spectrum of a film cast from chloroform showed no hydroxyl absorption and a strong carbonyl absorption at 1780 cm.$^{-1}$. The polymeric acid chloride was further characterized by formation of its anilide by addition of aniline to the chloroform solution which caused precipitation of aniline hydrochloride. A colorless polymer was obtained by precipitation of the filtrate with methanol. An infrared spectrum of the polymeric anilide showed NH absorption at 3390 cm.$^{-1}$ and CO absorption at 1680 cm.$^{-1}$. Elemental analysis (percent): C, 77.8 (78.3); H, 4.0 (4.0); Cl, 8.2 (8.3). The theoretical values in parentheses, were calculated on the basis of 60% substitution which was the degree of metalation found above by the silylation reaction.

A solution of 1 g. of the polycarboxylic acid in about 10 ml. of thionyl chloride was prepared, resulting in the formation of the acid chloride formation described above. To this solution was added 5 ml. of anhydrous sym-tetrachloroethane and 5 ml. of anhydrous nitrobenzene. A slow stream of boron trifluoride was added to the solution at room temperature. After 3 hours the deep red solution was diluted with chloroform and precipitation of the polymer accomplished with methanol. The infrared spectrum of the bright yellow polymer showed no hydroxyl absorption and a strong carbonyl absorption at 1710 cm.$^{-1}$. The polymer was soluble in aromatic and chlorinated solvents and had an intrinsic viscosity of 0.57. Elemental analysis (percent): C, 84.9 (85.1); H, 4.1 (4.2).

Using a heating rate of 150°/hr., a thermogravimetric analysis showed a beginning weight loss at 400° in ambient air and a 10% weight loss at 520°. In nitrogen, incipient weight loss occurred at 460°. The polymer of this example is now a copolymer having 2,6-diphenyl-1,4-phenylene oxide units and 3-phenyl-1,4-fluorenonylene oxide units having Formula d.

Example 3

A 250 ml. portion of metalated polymer A containing about 25 mmoles of repeat units was added rapidly in an atmosphere of dry nitrogen to a solution of 19 g. of benzophenone in 50 ml. of dry tetrahydrofuran. A green polymeric gel was formed which gradually turned yellow on standing at room temperature for about 4 hours. The product was dissolved in the reaction medium by acidification with glacial acetic acid and precipitated by addition of methanol. The product was redissolved in chloroform and again precipitated with methanol to yield 7.4 g. of coloroless polymer after drying at 80°/20 mm. The infrared spectrum of the polymer shows strong hydroxy absorption at 3540 cm.$^{-1}$ and other changes compared with the parent polymer, particularly in the 1150–1000 cm.$^{-1}$ region, characteristic for aromatic substitution patterns. Intrinsic viscosity of the polymer was 0.73. A thermogravimeter analysis showed a small weight loss at 300–320° C. presumably associated with the loss of hydroxyl, but no further weight loss occurred up to 450° C. Elemental analysis: C, 87.9%; H, 5.2%.

A fast stream of hydrogen chloride gas was bubbled into a solution of 3.5 g. of this polymer in about 70 ml. of benzene for about 10 seconds. A deep brown-purple color was formed immediately in this solution, but the color faded completely within a few minutes at room temperature. The colorless polymer was precipitated with methanol. It weighed 3.2 g. after drying. An infrared spectrum shows no hydroxyl absorption and characteristic changes in the 1150–1000 cm.$^{-1}$ region which are in agreement with ring closure between the diphenylhydroxymethyl group in the 3-position and the phenyl group in the 2-position to convert the initial 2,6-diphenyl-1,4-phenylene oxide group to a 3,9,9-triphenyl-1,4-fluorenylene oxide unit. The polymer had an elemental analysis of C, 87.7%; H, 4.9%. A thermogravimetric analysis showed very little weight loss up to 500° in nitrogen or ambient air.

Example 4

A 250 ml. portion of metalated polymer A in tetrahydrofuran containing about 25 mmoles of polymer repeat units was added to 22 g. of p-methoxybenzophenone in 50 ml. of dry tetrahydrofuran as described in Example 3. Using the same workup procedure and purification as in Example 3, a yield of 7.7 g. of colorless polymer was obtained. The infrared spectrum of this product is similar to that of the product in Example 3 showing strong hydroxyl absorption at 3540 cm.$^{-1}$. The NMR spectrum shows a signal due to CH$_3$O—; the ratio of CH$_3$O— protons to aromatic protons is 0.063, corresponding to about 30% of the repeat units being substituted with a carbinol group, i.e., a phenyl-p-methoxy phenylhydroxymethyl group has been substituted in the 3-position of about 30% of the repeating units of the parent polymer. The intrinsic viscosity was 0.78. Elemental analysis: C, 83.9%; H, 5.1%.

A solution of 1.5 g. of this polymer is 75 ml .of chloroform was stirred at room temperature with 10 ml. of an equal volume mixture of concentrated aqueous hydrochloric acid and water. After 15 hours, the deep red solution was separated from the aqueous layer, stirred with solid sodium hydroxide until the color had changed to yellow, filtered and the product precipitated by addition to methanol. After redissolving in chloroform and reprecipitating with methanol, a yield of 1.1 g. of a yellow polymer was obtained after drying at 60°/20 mm.

The infrared spectrum now shows no hydroxyl absorption, a new absorption band at 1630 cm.$^{-1}$, indicative of the quinoid structure of Formula c and some changes in the 1150–100 cm.$^{-1}$ region reflecting changes in the aromatic substitution pattern as compared to the intermediate product obtained above. The NMR spectrum showed less than one-third of the original $CH_3O$— intensity remaining in the polymer. This acid treatment leads to some ring closing to form a minor amount of fluorene groups in the polymer which retain the p-methoxy substituent, but ring closing is the major reaction when anhydrous acid is used as described in Example 5. This polymer when exposed to acid either in solution or in the vapor phase, immediately changes color from yellow to deep orange, indicating protonation, which is also known to occur in non-polymeric fuchsones of analogous structure. Elemental analysis: C, 86.8%; H, 4.9%.

Example 5

Anhydrous hydrochloric acid was bubbled for about 10 seconds into a solution of 1 g. of the intermediate product of Example 4 in 10 ml. of anhydrous benzene. Initially a dark-red color formed which faded to light red within a few minutes. After standing for about 1 hour at room temperature the solution was treated with sodium hydroxide pellets until the color had changed to yellow and the polymer product recovered by precipitation with methanol. Its infrared spectrum showed a weak carbonyl absorption at 1630 cm.$^{-1}$, indicating some quinoid substituents. No hydroxyl absorption was evident and at least 80% of the original $CH_3O$— signals were still observed in the NMR spectrum showing that most of the carbonyl groups had undergone the acid catalyzed ring closure converting the repeating units so modified to 3,9 - diphenyl-9-p-methoxyphenyl-1,4-fluorenylene oxide units.

Example 6

Using the entire amount of the metalated polymer B, 5.3 g. of benzaldehyde was added and the mixture stirred for three hours at room temperature under dry nitrogen. The color changed from gray-purple to dark tan during this time. The polymeric gel was poured into dilute methanolic hydrochloric acid, the white precipitate washed with methanol, dissolved in benzene and precipitated into hexane in order to remove the hydrocarbon from the sodium dispersion used. Approximately 10 g. of a white polymer was obtained whose elemental analysis showed: C, 87.9%; H, 5.1%. The infrared spectrum showed a strong hydroxyl absorption at 3540 cm.$^{-1}$ A 10% solution in benzene of the above polymer having some of its repeat units with a phenyl hydroxymethyl substituent in the 3-position was prepared and hydrogen chloride gas was bubbled in at room temperature. The solution was heated in a closed reaction vessel at 80° and samples were taken after one, two, and three hours. Infrared spectra showed that the ring closure was nearly complete after 2 hours; and no hydroxyl absorption was present after 3 hours, indicating complete reaction. The colorless polymer was now a copolymer in which some of the original 2,6-diphenyl-1,4-phenylene oxide units were now 3,9-diphenyl-1,4-fluorenylene oxide units. It was recovered by precipitation with methanol and had an elemental analysis: C, 88.1%; H, 5.0%.

Example 7

Metalated polymer was prepared similarly to that for metalated polymer B from 3 g. of poly(2,6-diphenyl-1,4-phenylene oxide) and 1.2 g. sodium dispersion and 0.8 g. n-propylchloride in 80 cc. of anhydrous benzene. It was mixed with 2.5 g. of p-tolualdehyde and agitated at room temperature for 15 hours in an atmosphere of dry nitrogen. A clear solution was obtained from which the product was obtained by precipitation with acidified methanol. The colorless precipitate was dissolved in benzene and the product reprecipitated by addition to n-hexane. A yield of 2.5 g. of colorless polymer was obtained, showing strong hydroxyl absorption at 3540 cm.$^{-1}$ in the infrared spectrum. Ring closure to a copolymer containing 3-phenyl - 9 - p - tolyl - 1,4 - fluorenylene units was effected by heating a 10% solution of the aforementioned hydroxyl containing polymer in benzene in the presence of anhydrous hydrochloric acid in a closed vessel at 80° for 3 hours. The colorless product was precipitated with methanol. No hydroxyl groups were present according to its IR spectrum. Elemental analysis: C, 88.0%; H, 5.2%.

Example 8

To metalated polymer prepared in the same way as described in the previous example was added a 50% excess of 4-methylbenzophenone. A greenish color developed which persisted throughout the 15 hour reaction period at room temperature. The reaction mixture was worked up by addition to acidified methanol, dissolution of the polymer precipitate in benzene and re-precipitation into n-hexane. The colorless polymer contains phenyl-p-tolyl hydroxymethyl substituents in the 3 position as evidenced by its spectra and chemical analysis: C, 87.4%; H, 5.0%.

Addition of gaseous hydrochloric acid to a benzene solution of this polymer results in a transient brown-purple color which fades within a few minutes, indicating ring closure to 3,9-diphenyl-9-p-tolyl-1,4-fluorenylene units. The product shows no hydroxyl absorption in its IR spectrum. When a benzene solution of the above hydroxyl-containing polymer is treated with aqueous hydrochloric acid or trifluoroacetic acid, a deep blue color is developed. The blue polymeric product can be isolated by precipitation with methanol. The infrared spectrum showed no hydroxyl group present.

The copolymers of this invention are readily molded into useful articles by well-known techniques at temperatures above about 250° C. The solutions of these polymers can be used to produce protective coatings which may be used for electrical insulation. The polymers can be mixed with various fillers, modifying agents, etc., such as dyes, pigments, stabilizers, plasticizers, etc.

Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. A moldable polymer whose repeating units are 2,6-diphenyl-1,4-phenylene oxide units and 1,4-phenylene units having at least one of the formulae:

(a)

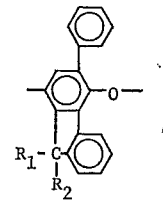

and (b)

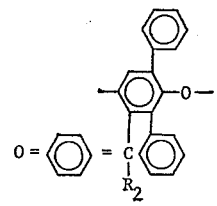

where, independently, $R_1$ is phenyl, p-$C_{1-8}$-alkylphenyl, or p-$C_{1-8}$-alkoxyphenyl, $R_2$ is the same as $R_1$ and, in addition, hydrogen or, together, $R_1$ and $R_2$ are oxygen.

2. The polymers of claim 1 wherein the 1,4-phenylene units are those having Formula *a*.

3. The polymers of claim 2 wherein $R_1$ and $R_2$ are each phenyl.

4. The polymers of claim 2 wherein $R_1$ is phenyl and $R_2$ is hydrogen.

5. The polymers of claim 2 wherein $R_1$ is p-methylphenyl and $R_2$ is hydrogen.

6. The polymers of claim 2 wherein $R_1$ is p-methylphenyl and $R_2$ is phenyl.

7. The polymers of claim 2 wherein $R_1$ and $R_2$ together are oxygen.

8. The polymers of claim 1 wherein the 1,4-phenylene units have Formula *b*.

9. The polymers of claim 8 wherein $R_2$ is phenyl.

10. The process of making the compositions of claim 1 which comprises *a* reacting the alkali metal of a poly (2,6-diphenyl-1,4-phenylene oxide) having some 1,4-phenylene oxide units having the formula:

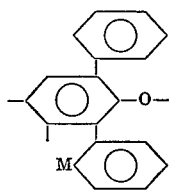

where M is an alkali metal with carbon dioxide, $R_1$—CHO or

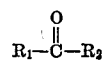

where $R_1$ and $R_2$ are as defined in claim 1, the carboxyl group formed when carbon dioxide is used as the reagent, being further reacted with a halogenating agent capable of converting said carboxyl group to a carbonyl halide group and *b* effecting further reaction of the product of *a* with a Friedel-Crafts catalyst or a mineral acid.

References Cited

UNITED STATES PATENTS 3,402,144   9/1968   Hay.

MELVIN GOLDSTEIN, Primary Examiner

U.S. Cl. X.R.

260—32.4, 33.6 R, 33.8 R